US010669870B2

(12) United States Patent
Wilber

(10) Patent No.: US 10,669,870 B2
(45) Date of Patent: *Jun. 2, 2020

(54) VANE FOR JET ENGINE MID-TURBINE FRAME

(71) Applicant: United Technologies Corporation, Hartford, CT (US)

(72) Inventor: John E. Wilber, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 465 days.

This patent is subject to a terminal disclaimer.

(21) Appl. No.: 15/032,017

(22) PCT Filed: Jan. 23, 2015

(86) PCT No.: PCT/US2015/012651
§ 371 (c)(1),
(2) Date: Apr. 25, 2016

(87) PCT Pub. No.: WO2015/156889
PCT Pub. Date: Oct. 15, 2015

(65) Prior Publication Data
US 2016/0258305 A1 Sep. 8, 2016

Related U.S. Application Data

(60) Provisional application No. 61/932,462, filed on Jan. 28, 2014.

(51) Int. Cl.
*F01D 9/04* (2006.01)
*F01D 11/00* (2006.01)
(Continued)

(52) U.S. Cl.
CPC .............. *F01D 9/04* (2013.01); *F01D 9/02* (2013.01); *F01D 9/042* (2013.01); *F01D 9/06* (2013.01);
(Continued)

(58) Field of Classification Search
CPC . F01D 9/04; F01D 9/041; F01D 9/042; F01D 9/06; F01D 9/065; F01D 25/28;
(Continued)

(56) References Cited

U.S. PATENT DOCUMENTS 3,628,880 A * 12/1971 Smuland .................. F01D 5/189
 415/175
3,706,508 A * 12/1972 Moskowitz ............. F01D 5/183
 415/115
(Continued)

FOREIGN PATENT DOCUMENTS

EP 0344877 12/1989
WO 2010002296 1/2010

OTHER PUBLICATIONS

International Preliminary Report on Patentability dated Aug. 2, 2016 in Application No. PCT/US2015/012651.
(Continued)

*Primary Examiner* — Christopher Verdier
(74) *Attorney, Agent, or Firm* — Snell & Wilmer L.L.P.

(57) ABSTRACT

A mid-turbine frame (MTF") for a jet engine is disclosed and comprises a duct that extends between a high pressure turbine ("HPT") and a low pressure turbine ("LPT"), the duct comprising a plurality of segments that together form an outer annular structure and an inner annular structure, the inner annular structure situated radially inward of the outer annular structure, and/or a plurality of vanes that extend radially outward from the inner annular structure toward the outer annular structure, each vane comprising a channel.
(Continued)

Each segment may be coupled to an adjacent segment by a seal.

12 Claims, 5 Drawing Sheets

(51) Int. Cl.
| | | |
|---|---|---|
| *F02C 7/20* | (2006.01) | |
| *F01D 25/28* | (2006.01) | |
| *F01D 9/02* | (2006.01) | |
| *F01D 9/06* | (2006.01) | |
| *F01D 25/12* | (2006.01) | |
| *F02C 7/16* | (2006.01) | |

(52) U.S. Cl.
CPC ............ *F01D 9/065* (2013.01); *F01D 11/005* (2013.01); *F01D 25/12* (2013.01); *F01D 25/28* (2013.01); *F02C 7/16* (2013.01); *F02C 7/20* (2013.01); *F05D 2220/32* (2013.01); *F05D 2240/55* (2013.01); *F05D 2260/20* (2013.01); *F05D 2260/201* (2013.01); *Y02T 50/673* (2013.01)

(58) Field of Classification Search
CPC ...... F01D 25/12; F01D 25/246; F01D 11/005; F02C 7/20; F05D 2260/20; F05D 2260/201; F05D 2240/55
USPC ......................................... 415/135, 138, 139
See application file for complete search history.

(56) References Cited

U.S. PATENT DOCUMENTS

| | | | |
|---|---|---|---|
| 4,920,741 A | 5/1990 | Nash et al. | |
| 4,920,742 A * | 5/1990 | Nash ..................... | F01D 25/162 |
| | | | 415/116 |
| 8,356,981 B2 | 1/2013 | Cooke et al. | |
| 10,344,618 B2 * | 7/2019 | Wilber .................. | F01D 25/162 |
| 2004/0168443 A1 | 9/2004 | Moniz et al. | |
| 2007/0160475 A1 * | 7/2007 | Rogers ................... | F01D 5/186 |
| | | | 416/96 R |
| 2010/0040462 A1 | 2/2010 | Praisner et al. | |
| 2010/0135770 A1 * | 6/2010 | Durocher ............... | F01D 9/065 |
| | | | 415/69 |
| 2010/0266386 A1 | 10/2010 | Broomer et al. | |
| 2010/0307165 A1 * | 12/2010 | Wong .................... | F01D 25/162 |
| | | | 60/796 |
| 2011/0081237 A1 | 4/2011 | Durocher et al. | |
| 2011/0085895 A1 | 4/2011 | Durocher et al. | |
| 2013/0259672 A1 | 10/2013 | Suciu et al. | |
| 2014/0109590 A1 * | 4/2014 | Casavant ................ | F01D 11/24 |
| | | | 60/782 |
| 2016/0258309 A1 * | 9/2016 | Wilber ................... | F01D 9/041 |
| 2016/0281524 A1 * | 9/2016 | Wilber ..................... | F01D 9/06 |
| 2017/0044932 A1 * | 2/2017 | Wilber ................... | F01D 9/065 |

OTHER PUBLICATIONS

International Search Report and Written Opinion dated Oct. 5, 2015 in Application No. PCT/US2015/012651.
European Patent Office, European Search Report dated Feb. 8, 2017 in Application No. 15777268.2-1610.
European Patent Office, European Search Report dated Jul. 24, 2019 in Application No. 15777268.2.

* cited by examiner

VANE FOR JET ENGINE MID-TURBINE FRAME

CROSS-REFERENCE TO RELATED APPLICATIONS

This application is U.S. national phase filing under 35 U.S.C. § 371 of PCT/US2015/012651 filed on Jan. 23, 2015 and entitled "VANE FOR JET ENGINE MID-TURBINE FRAME," which claims priority from U.S. Provisional Application No. 61/932,462 filed on Jan. 28, 2014 and entitled "VANE FOR JET ENGINE MID-TURBINE FRAME." Both of the aforementioned applications are incorporated herein by reference in their entirety.

FIELD

The present disclosure relates to a vane for a jet engine mid-turbine frame, and more particularly, to a vane for a jet engine mid-turbine frame vane segment.

BACKGROUND

Gas turbine engines (e.g., jet engines) generally include a compressor to pressurize inflowing air, a combustor to burn a fuel in the presence of the pressurized air, and a turbine to extract energy from the resulting combustion gases. The compressor may comprise a low pressure compressor, as well as a high pressure compressor. The turbine may likewise comprise a high pressure turbine and a low pressure turbine.

SUMMARY

In various embodiments, an apparatus is provided comprising a radially outward segment portion, a radially inward segment portion, and a vane that extends between the radially outward segment portion and the radially inward segment portion.

In various embodiments, a mid-turbine frame ("MTF") for a jet engine is provided comprising a duct that extends between a high pressure turbine ("HPT") and a low pressure turbine ("LPT"), the duct comprising a plurality of segments that together form an outer annular structure and an inner annular structure, the inner annular structure is situated radially inward of the outer annular structure and a vane that extend radially outward from the inner annular structure through the outer annular structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
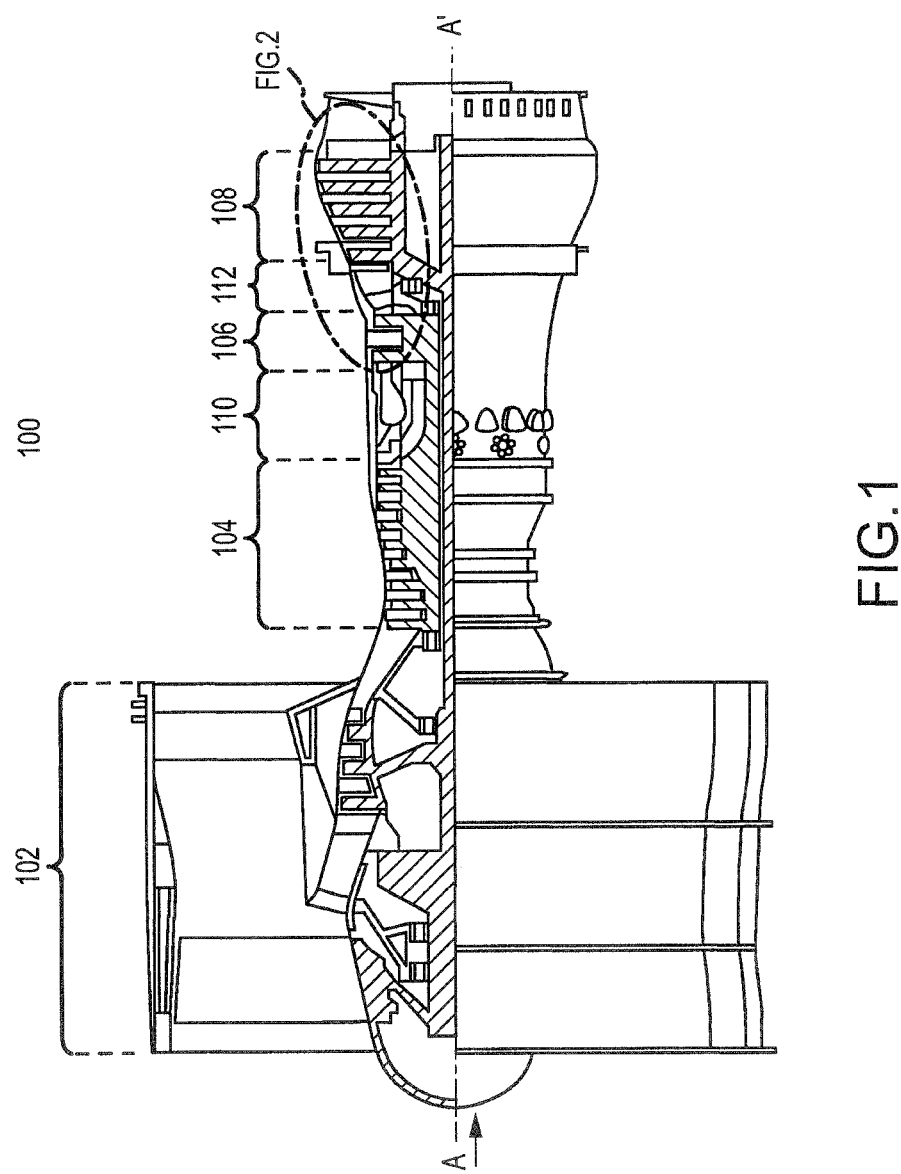
FIG. 1 illustrates, in accordance with various embodiments, a cutaway view of a jet engine.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion. For example, with reference to FIG. 1, central axis A-A' may be described as extending from a forward position (A) to an aft position (A').

A gas turbine engine may comprise a high pressure turbine and a low pressure turbine. Hot gas from a combustion section of a gas turbine engine may flow into the high pressure turbine and the low pressure turbine, that order, from forward to aft. The kinetic energy of the hot gas is captured by the high pressure turbine and the low pressure turbine and converted into more other useful forms of energy. High pressure turbines tend to operate at maximum efficiency when the gas is hot and the high pressure turbine is small. Low pressure turbines tend to work at maximum efficiency when the hot gases operate at the low pressure turbine's largest diameter. Thus, for improved efficiency, there may be a large difference the diameter between a high pressure turbine and a low pressure turbine. Conventionally, the forward stages of the low pressure turbine were not as efficient as could be. However, by using or coupling a mid-turbine frame between the high pressure turbine and the low pressure turbine, the hot gases may rapidly expand as they exit the high pressure turbine to gain a large diameter upon entry into the forward stages of the low pressure turbine. For further information, U.S. Provisional Patent Application Ser. No. 61/925,001 is hereby incorporated by reference in its entirety. U.S. patent application Ser. No. 15/096,656 claims priority to U.S. Provisional Patent Application Ser. No. 61/925,001.

With reference now to FIG. 1, gas turbine engines (e.g., jet engines) 100 may extend from forward to aft along a central axis A-A'. As described above, gas turbine engines 100 generally include a compressor to pressurize inflowing air, a combustor to burn a fuel in the presence of the pressurized air, and a turbine to extract energy from the resulting combustion gases. The compressor may be divided into two sections. Specifically, the compressor may comprise a low pressure compressor 102 situated forward of a high pressure compressor 104. The turbine may likewise be divided into two sections. These include a high pressure turbine (or "HPT") 106 situated forward of a low pressure turbine (or "LPT") 108. The combustor 110 may be disposed axially aft of the HPT 106 and axially forward of the LPT 108.

Figure 2:
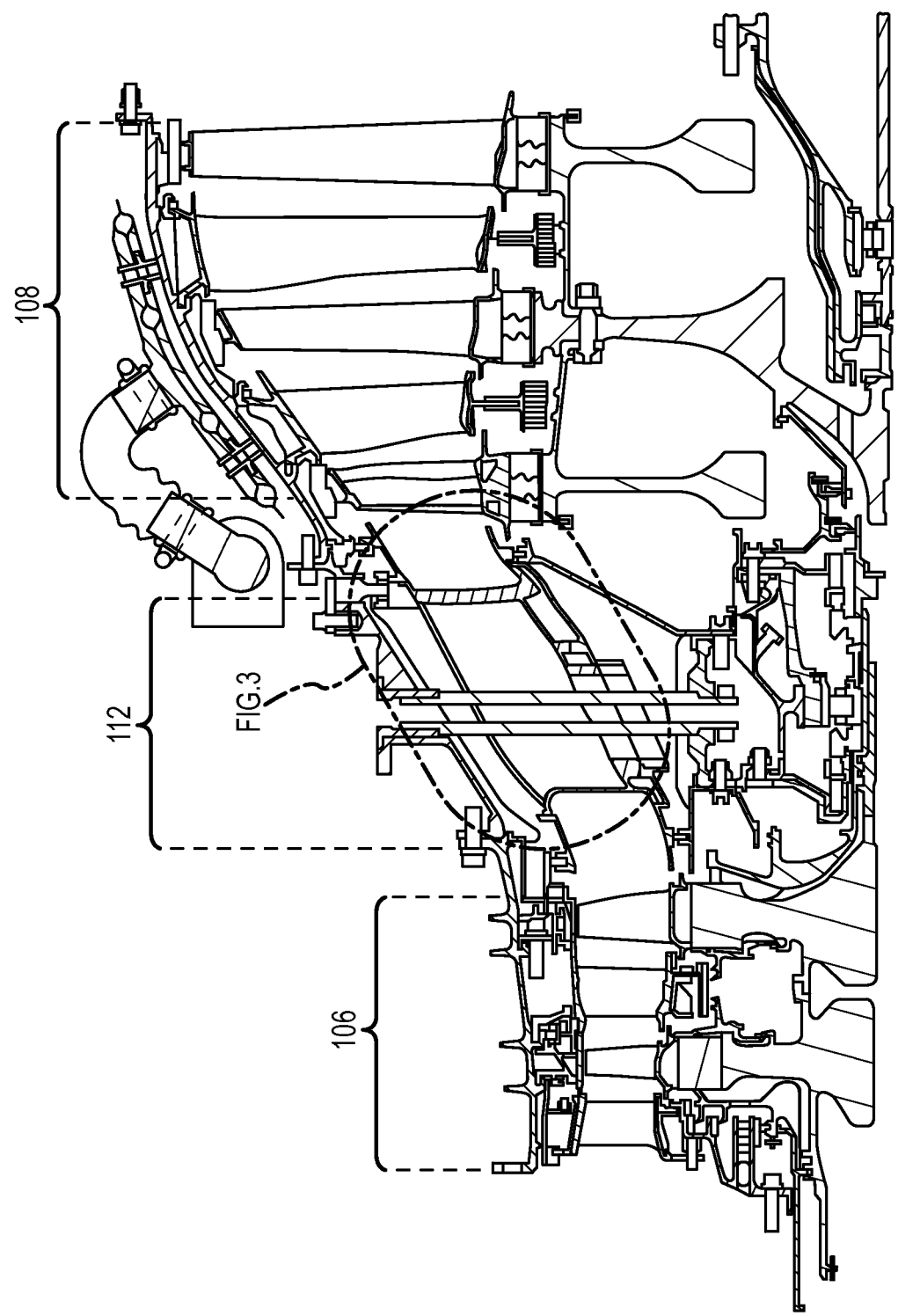
FIG. 2 illustrates, in accordance with various embodiments, a cross-sectional view of portion of a jet engine turbine.

In various embodiments, a structure, which may be referred to herein as a "mid-turbine frame" or "MTF" 112 may be included as part of the gas turbine engine 100. More particularly, as shown with respect to FIG. 2, the MTF 112 may be disposed aft of the HPT 106 and forward of the LPT 108. The MTF 112 may generally comprise a duct configured to convey (hot) combustion gasses from the HPT 106 to the LPT 108. The MTF 112 may thus comprise an annular and/or semi-annular duct configured, in particular, to permit the expansion of hot gasses exiting the HPT 106 into the LPT 108. The MTF 112 may enlarge in diameter as it extends from forward to aft along the central axis A-A'.

Figure 3:
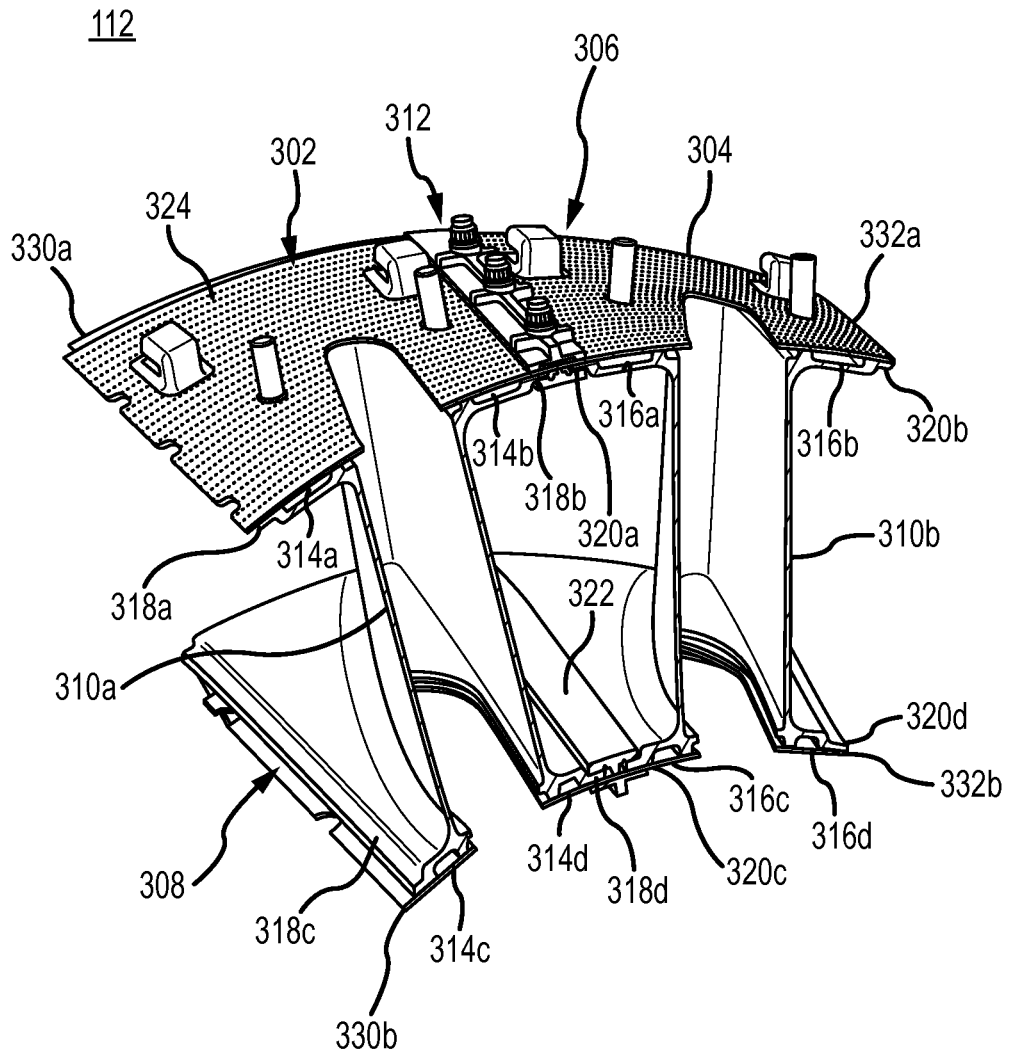
FIG. 3 illustrates, in accordance with various embodiments, a cutaway view of a MTF.

With reference to FIG. 3, the MTF 112 may more particularly comprise a plurality of segments (e.g., to illustrate a portion of an MTF 112, a first segment 302 and second segment 304) that together form an MTF 112. For example, and again, to illustrate a portion of an MTF 112, the first segment 302 and the second segment 304 may comprise radially outer arcing surfaces and radially inner arcing surfaces that may be joined or sealed, as described herein, to form an outer annular structure 306 and an inner annular structure 308 of an MTF 112. Stated another way, first segment 302 and second segment 304 comprise arc segments that, when coupled, form outer annular structure 306 and inner annular structure 308, wherein outer annular structure 306 is radially farther from central axis A-A' than inner annular structure 308. Specifically, the first segment 302 may comprise an outer arcing surface 330a and an inner arcing surface 330b, while the second segment 304 may comprise an outer arcing surface 332a and an inner arcing surface 332b. Outer arcing surface 332a may be coupled to a radially outward segment portion. Inner arcing surface 332b may be coupled to a radially inward segment portion. A radially inward segment portion may refer to a portion of a segment, such as segment 302, that is disposed radially inward of an outward segment portion. The inner annular structure 308 may be situated radially inward of the outer annular structure 306, where the radially inward indicates closer proximity to central axis A-A'.

The MTF 112 may further comprise a plurality of vanes (e.g., 310a and 310b) that extend radially outward from the inner annular structure 308 toward the outer annular structure 306. Each vane may comprise a channel that houses a variety of components (e.g., support struts, air and oil service lines, and the like). In various embodiments, any number of vanes may be used in the construction of an MTF 112 (e.g., 9 vanes, 18 vanes, and the like).

It may be understood that in a gas turbine engine, various components are supported by support structures such as support struts and the like. Moreover, air and oil service lines may be along the radius of central axis A-A' to serve various radially inward components. However, as MTF 112 is situated aft of HPT 106 and is configured to receive hot gases from HPT 106, support struts, air and oil service lines, and the like would be impaired or destroyed by hot gases from HPT 106. In various embodiments, hot gases from HPT 106 are above 900° F. Accordingly, a plurality of vanes (e.g., 310a and 310b) may be configured to both shield high temperature intolerant components from hot gases while also imposing minimal or near minimal aerodynamic resistance.

In various embodiments, each of the segments (e.g., 302 and 304) comprising the outer annular structure 306 and/or the inner annular structure 308 may comprise a plurality of channels (e.g., 314a, 314b, 314c, 314d, 316a, 316b, 316c, 316d) that extend axially along an axial length each of the segments.

Each segment (e.g., 302 and 304) comprising the outer annular structure 306 and the inner annular structure 308 may include a plurality of tenons that define axial terminuses of each segment 302 and 304. For example, the first segment 302 may include a first and second tenon (e.g., 318a and 318b) that define a first and second outer axial terminus of the first segment 302 and a third and fourth tenon (e.g., 318c and 318d) that define a third and fourth inner axial terminus of the first segment 302.

The same may be true with respect to the second segment 304. For example, the second segment 304 may include a first and second tenon (e.g., 320a and 320b) that define a first and second outer axial terminus of the second segment 304. Likewise, the second segment 304 may include a third and fourth tenon (e.g., 320c and 320d) that define a third and fourth inner axial terminus of the second segment.

In various embodiments, each segment (e.g., 302 and 304) comprising the MTF 112 may be coupled to an adjacent segment by a seal 312 and/or 322. For example, with reference to FIG. 3, the second tenon 318b of the first segment 302 may be coupled by the seal 312 to the first tenon 320a of the second segment 304. The seal 312 may thus couple or clamp the first segment 302 to the second segment 304 to form the outer annular structure 306.

The seal 322 may similarly couple or clamp the fourth tenon 318d of the first segment 302 to the third tenon 320c of the second segment 304. Thus, a plurality of seals (e.g., 312 and 322) may couple a plurality of segments (both with respect to their respective inner annular structures and outer annular structures) to form a substantially annular duct or MTF 112.

Each of the outer annular structure 306 and/or inner annular structure 308 may be overlaid by (and/or coupled to, via, e.g., the seal 312 and/or 322) to a perforated structure 324 (as shown with respect to the outer annular structure 306). The perforated structure 324 may comprise an arced surface that conforms or substantially conforms to the arc of the inner and/or outer annular structures 306 and/or 308. The perforated structure may further comprise any of a variety of temperature resistant materials and/or alloys, and may comprise primarily sheet metal in nature.

In operation, it may be beneficial to cool the equipment, as described above, that passes through the vanes 310a and 310b. As described, these vanes may pass through the MTF 112 duct, through which combustion gasses may flow at high velocity and temperature. Thus, to maintain the integrity of the components within the vanes, cooling may be desired.

To achieve this result, cooling air may be pumped in from, for example, an outer portion of the MTF 112, such that it impinges on the perforated structure 324. As this occurs, the air may pass through the perforated structure 324 (due to a difference in pressure) to cool each of the first segment 302 and second segment 304 of the outer annular structure 306.

Figure 4:
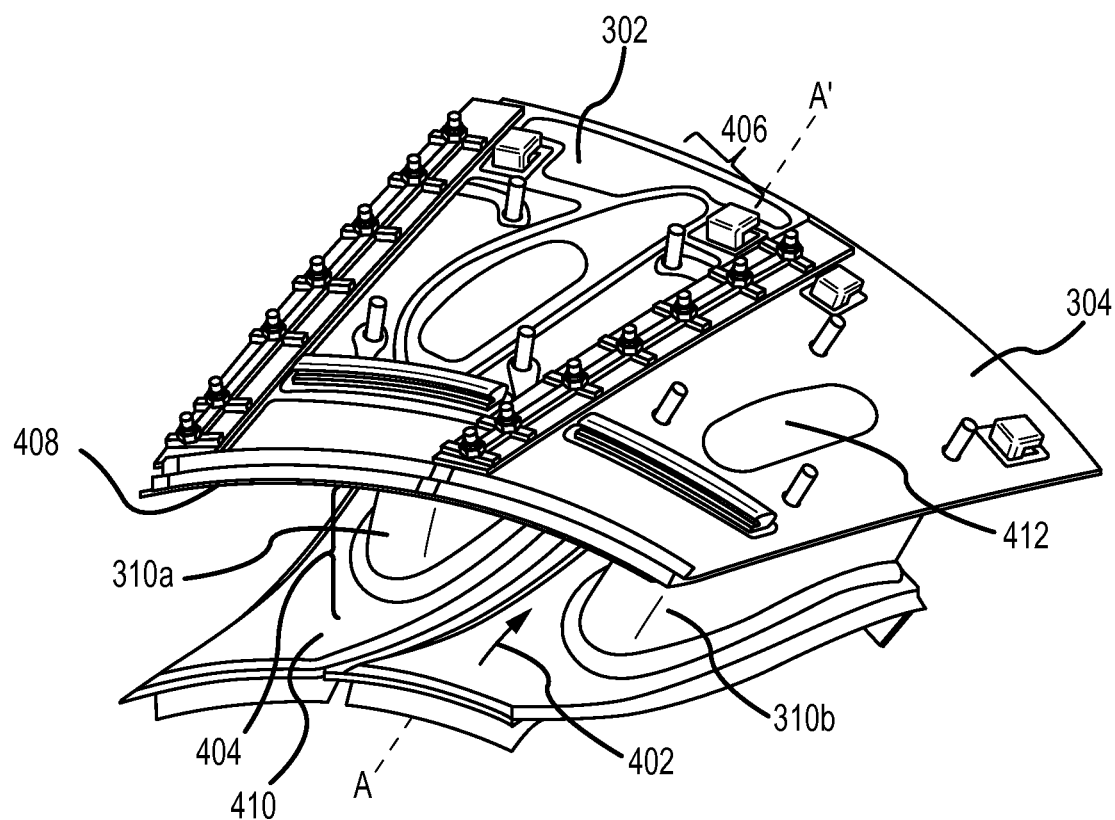
FIG. 4 illustrates, in accordance with various embodiments, a perspective view of vanes of an MTF.
Figure 5:
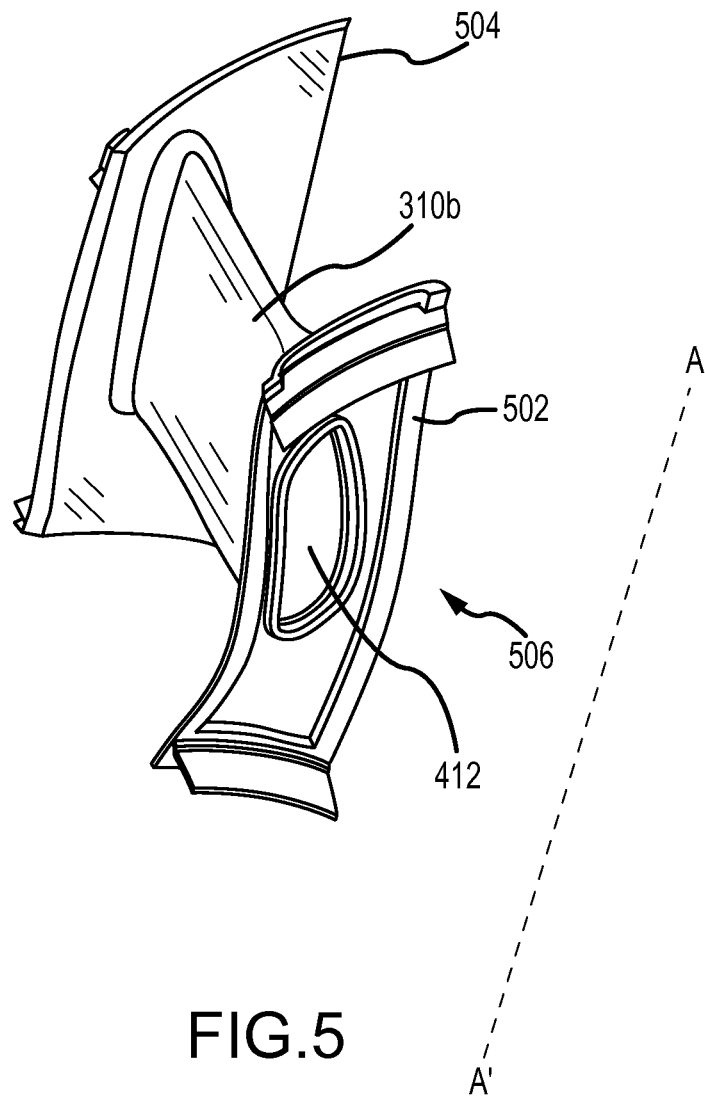
FIG. 5 illustrates, in accordance with various embodiments, a further perspective view of vanes of an MTF.

With reference to FIGS. 4 and 5, central axis A-A' is shown with respect to segments 302 and 304. Vanes 310a and 310b are shown disposed in gas flow 402. Gas flow 402 may flow in a volume bounded by surface 408 and 410. Vanes 310a and 310b are shaped so as to reduce aerodynamic resistance. For example, the curved profile of vanes 310a and 310b may tend to reduce drag. Vane 310b, for example, defines channel 412 that extends radially toward central axis A-A'. One or more high temperature intolerant components may be disposed along or at least partially along channel 412 so that vane 310b provides thermal and/or aerodynamic protection to the one or more high temperature intolerant components.

Vanes 310a and 310b may vary in radial length from forward to aft. For example, the radial length of vane 310a at its most forward position is shown as length 404. In various embodiments, the radial length of vane 310a at its most aft position is shown as length 406. In various embodiments, length 404 is less than length 406.

Vanes 310a and 310b may comprise any material suitable for providing thermal and/or aerodynamic protection to one or more high temperature intolerant components. For example, vanes 310a and 310b may comprise nickel, cobalt, and other metals and/or metal alloys.

With reference to FIG. 5, vane 310b is shown extending between radially outward arc segment 504 and radially inward arc segment 502. Vane 310b defines channel 412. High temperature intolerant component 506 is shown disposed in channel 412. High temperature intolerant component 506 may comprise, for example, one or more of air and oil service lines and/or support struts.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
    a radially outward segment portion;
    a radially inward segment portion;
    a vane that extends between the radially outward segment portion and the radially inward portion;
    a perforated structure that is disposed radially outward of the radially outward segment portion; and
    a seal clamping the radially outward segment portion to the perforated structure, wherein the seal is configured to couple the radially outward segment to an adjacent radially outward segment.

2. The apparatus of claim 1, wherein the vane defines a channel.

3. The apparatus of claim 1, wherein the radially outward segment portion comprises a radially inner surface and the radially inward segment portion comprises a radially outer surface.

4. The apparatus of claim 3, wherein the radially inner surface and the outer surface define a gas flow path.

5. The apparatus of claim 4, wherein the flow path is axial.

6. The apparatus of claim 4, wherein the gas flow path provides fluid communication between a high pressure turbine and a low pressure turbine.

7. The apparatus of claim 1, wherein each of a plurality of perforations in the perforated structure are configured to receive cooling air.

8. The apparatus of claim 1, wherein an annular structure is formed from the radially outward segment portion and the radially inward segment portion.

9. The apparatus of claim 1, further comprising an annular structure formed from a plurality of segments that include a plurality of radially outward segment portions and a plurality of radially inward segment portions;
    the plurality of radially outward segment portions comprises the radially outward segment portion; and
    the plurality of radially inward segment portions comprises the radially inward segment portion.

10. A mid-turbine frame ("MTF") for a jet engine comprising:
    a duct that extends between a high pressure turbine ("HPT") and a low pressure turbine ("LPT"), the duct comprising a plurality of segments that together form an outer annular structure and an inner annular structure, the inner annular structure is situated radially inward of the outer annular structure; and
    a vane that extends radially outward from the inner annular structure to the outer annular structure;
    the outer annular structure comprises a perforated structure that is disposed radially outward of a first radially outward segment portion and a second radially outward segment portion; and
    a seal clamping the first radially outward segment portion to the perforated structure, wherein the seal couples the first radially outward segment portion to the second radially outward segment portion.

11. The MTF of claim 10, wherein the vane defines a channel.

12. The MTF of claim 10, wherein the vane extends through the outer annular structure.

* * * * *